US011082800B2

(12) United States Patent
Shaposhnikov et al.

(10) Patent No.: US 11,082,800 B2
(45) Date of Patent: Aug. 3, 2021

(54) METHOD AND SYSTEM FOR DETERMINING AN OCCURRENCE OF A VISIT TO A VENUE BY A USER

(71) Applicant: YANDEX EUROPE AG, Lucerne (CH)

(72) Inventors: Denis Evgenevich Shaposhnikov, Krasnodarskiy kray (RU); Irina Anatolevna Goltsman, Moscow (RU); Aleksandr Leonidovich Shishkin, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

(21) Appl. No.: 16/934,575

(22) Filed: Jul. 21, 2020

(65) Prior Publication Data
US 2021/0136514 A1    May 6, 2021

(30) Foreign Application Priority Data

Nov. 6, 2019   (RU) .............................. 2019135563

(51) Int. Cl.
*H04W 4/02*    (2018.01)
*H04W 4/021*   (2018.01)
*G06K 9/62*    (2006.01)
*G06N 20/00*   (2019.01)
*H04W 64/00*   (2009.01)

(52) U.S. Cl.
CPC .......... *H04W 4/021* (2013.01); *G06K 9/6256* (2013.01); *G06N 20/00* (2019.01); *H04W 64/00* (2013.01)

(58) Field of Classification Search
CPC ...... H04W 4/021; G06N 20/00; G06K 9/6256
See application file for complete search history.

(56) References Cited

U.S. PATENT DOCUMENTS

2016/0295372 A1* 10/2016 Kapicioglu ........... H04W 4/021

OTHER PUBLICATIONS

Seneviratne et al., "SSIDs in the Wild: Extracting Semantic Information from WiFi SSIDs", 40th Annual IEEE Conference on Local Computer Networks, 2015, 4 pages.

* cited by examiner

*Primary Examiner* — Curtis B Odom
(74) *Attorney, Agent, or Firm* — BCF LLP

(57) ABSTRACT

There is disclosed a method and system for determining an occurrence of a visit to a venue by a user associated with an electronic device. The method comprises, at a training phase: receiving a SSID; receiving one or more venue identifiers; generating a positive pair; generating a set of negative pairs; wherein the positive pair and the set of negative pairs form a set of training data; training a machine learning algorithm by determining a set of features representative of a property of the set of training data; and generating an inferred function, the inferred function being configured to determine a confidence parameter of a given pair including a given SSID received from the electronic device paired to a given venue identifier, the confidence parameter representing a probability of an occurrence of a visit by the user to the venue associated with the given venue identifier.

20 Claims, 8 Drawing Sheets

METHOD AND SYSTEM FOR DETERMINING AN OCCURRENCE OF A VISIT TO A VENUE BY A USER

CROSS-REFERENCE

The present application claims priority to Russian Patent Application No. 2019135563, entitled "Method and System for Determining an Occurrence of a Visit to a Venue by a User," filed on Nov. 6, 2019, the entirety of which is incorporated herein by reference.

FIELD

The present technology relates to the determination of an occurrence of a visit to a venue by a user in general, and specifically to a method and a system for determining an occurrence of a visit to a venue by a user.

BACKGROUND

User behaviour data is used for many of the modern information technology-related businesses, as it allows the business to measure the impact of taken decisions and to gain new insights into existing or new business opportunities. Generally speaking, user behaviour data can be broadly separated into two types, namely online user behaviour and offline user behaviour.

Online user behaviour includes actions taken by a user on the web, and has been conventionally heavily analyzed by internet companies to gain new insights on how to improve their services. On the other hand, offline user behaviour, which includes actions taken by a user outside the web, also provides information about the user's preferences and needs, which can be subtle or undetectable in the user's online behaviour. For obvious reasons, it is difficult to obtain data relating to the user's offline behaviour.

For example, it is difficult to obtain information such as which locations (stores, organizations, offices, etc.) a user has visited, unless the user makes it known on the web (for example, by checking in or otherwise associating herself with a given location using social media or other online presence applications).

Even though a number of service providers or other commercial organizations provide a possibility to check-in for a user—to send a signal that the user is visiting a particular venue. However, for the majority of mobile applications, it is unreasonable or far-fetched to introduce such functionality for tracking the user's behaviour.

The article entitled "*SSIDs IN THE WILD: EXTRACTING SEMANTIC INFORMATION FROM WIFI SSIDs*", published at The $40^{th}$ IEEE Conference on Local Computer Networks (LCN), on October 2015 by Suranga Seneviratne et al. discloses the semantics of one key attribute of a Wi-Fi network, namely the SSID name. Using a dataset of approximately 120,000 Wi-Fi access points and their corresponding geo-locations, the article use a set of similarity metrics to relate SSID names to known business venues such as cafes, theatres, and shopping centers.

SUMMARY

It is an object of the present technology to provide improved method and systems for determining an occurrence of a visit to a venue by a user.

Without wishing to be bound to any specific theory, embodiments of the present technology have been developed based on an assumption that if a user was connected to a public Wi-Fi hotspot of an organization, the user must have visited this organization. Accordingly, a technical problem to be solved by the present technology is to properly match the SSID and venue entries.

The prior art method of achieving the matching is based primarily on the analysis of, inter alia, the textual similarity between the SSID and the venue name. Although this may provide a fair result, the developers of the present technology have noted that there is still room for improvements.

In accordance with a first broad aspect of the present technology, there is provided a computer-implemented method of determining an occurrence of a visit to a venue by a user associated with an electronic device, the method being executed by a server, the method comprising, at a training phase: receiving, by the server, a training SSID; receiving, by the server, one or more training venue identifiers, each of the one or more training venue identifiers comprising information associated with a respective training venue; generating, by the server, a positive training pair, the positive training pair including the training SSID paired with a first training venue identifier associated with the training SSID; generating, by the server, a set of negative training pairs, the set of negative training pairs including at least a second training venue identifier paired with the training SSID, the second training venue identifier not associated with the training SSID; wherein the positive training pair and the set of negative training pairs form a set of training data; training a machine learning algorithm (MLA), the training including: determining, by the server, a set of features representative of a property of the set of training data, the set of features including: a set of relational features indicative of a relational linkage between the one or more training venue identifiers and the training SSID; a set of SSID-specific features indicative of one or more characteristics of the training SSID; and a set of training venue specific features indicative of one or more characteristics of the one or more training venue identifiers; and generating an inferred function based on the set of features, the inferred function being configured to determine a confidence parameter of a given pair including a given SSID received from the electronic device of the user paired to a given venue identifier, the confidence parameter representing a probability of an occurrence of a visit by the user to the venue associated with the given venue identifier.

In some non-limiting embodiments of the method, the method further comprising, at an in-use phase: receiving, from the electronic device, by the server, a SSID previously accessed by the electronic device; receiving, by the server, a first venue identifier and a second venue identifier based on the SSID; generating, by the server, a first pair comprising the SSID and the first venue identifier and a second pair comprising the SSID and the second venue identifier; determining, using the MLA, the confidence parameter of each of the first pair and second pair based on the set of linking features and the set of non-linking features associated with each of the first pair and the second pair; and in response to determining that the confidence parameter of the first pair is above the confidence parameter of the second pair, determining, by the server, the occurrence of the visit by the user to a venue associated with the first venue identifier.

In some non-limiting embodiments of the method, the first venue identifier is associated with a first venue location and the second venue identifier being associated with a second venue location, the method further comprising: receiving, from the electronic device, an access location at which the SSID has been accessed by the electronic device;

and receiving the first venue identifier and the second venue identifier in response to the first venue location and the second venue location being within a predetermined distance from the access location.

In some non-limiting embodiments of the method, the method further comprises: receiving an electronic device ID associated with the electronic device; determining a profile parameter of the user based on the electronic device ID, the profile parameter being indicative of profile characteristics of the user; in response to the determining the occurrence of the visit by the user to the venue, selecting a digital content item based on the profile parameter, the digital content item being associated with the venue; and transmitting the digital content item to the electronic device for display.

In some non-limiting embodiments of the method, a ratio of the positive training pair to the set of negative training pairs within the set of training data is 1 to 40.

In some non-limiting embodiments of the method, method further comprises: receiving, a training SSID location, the training SSID location corresponding to a geographical location associated with the training SSID; analyzing a plurality of training venue identifiers, each of the training venue identifier included within the plurality of training venue identifiers being associated with a training venue location; and wherein receiving the one or more training venue identifiers comprises, receiving one or more training venue identifiers each having a respective training venue location in a predetermined distance from the training SSID location.

In some non-limiting embodiments of the method, the predetermined distance corresponds to 75 metres from the training SSID location.

In some non-limiting embodiments of the method, the generating the positive training pair comprises: pairing the training SSID with the first training venue identifier in response to the training SSID location corresponding to the training venue location associated with the first training venue identifier; and wherein the generating the set of negative training pairs comprises: pairing the training SSID with at least the second training venue identifier in response to the training SSID location being different to the training venue location associated with the second training venue identifier.

In some non-limiting embodiments of the method, for a given training venue identifier, the information associated with a given training venue comprises at least one of: a name of the training venue; an operating status of the training venue; a location of the training venue; a category associated with the training venue; and one or more URLs associated with the training venue.

In some non-limiting embodiments of the method, the method further comprises: receiving a training SSID location, the training SSID location corresponding to a geographical location associated with the training SSID; and wherein the information associated with the given training venue further comprises a training venue location indicative of a location of the training venue; and the set of relational features comprises at least one of: a distance between the training SSID location and the training venue location; a cosine similarity between character frequency vectors of the name of the training venue and the training SSID; a cosine similarity between trigram frequency vectors of the name of the training venue and the training SSID; a cosine similarity between token frequency vectors of the name of the training venue and the training SSID; and a cosine similarity between TF-IDF vectors of the name of the training venue and the training SSID.

In some non-limiting embodiments of the method, the set of SSID-specific features comprises at least one of: a character length of the training SSID; and a number of lexical tokens within the training SSID.

In some non-limiting embodiments of the method, the set of non-linking features comprises at least one of: the operating status of the training venue; the category associated with the venue; and a number of URL variations associated with the training venue.

In some non-limiting embodiments of the method, the MLA is using a Friedman's gradient boosting decision trees model.

In accordance with another broad aspect of the present technology, there is provided a server for determining an occurrence of a visit to a venue by a user associated with an electronic device, the server comprising a processor configured to, at a training phase: receive, a training SSID; receive, one or more training venue identifiers, each of the one or more training venue identifiers comprising information associated with a respective training venue; generate, a positive training pair, the positive training pair including the training SSID paired with a first training venue identifier associated with the training SSID; generate, a set of negative training pairs, the set of negative training pairs including at least a second training venue identifier paired with the training SSID, the second training venue identifier not associated with the training SSID; wherein the positive training pair and the set of negative training pairs form a set of training data; train a machine learning algorithm (MLA), to train the MLA the processor being configured to: determine, a set of features representative of a property of the set of training data, the set of features including: a set of relational features indicative of a relational linkage between the one or more training venue identifiers and the training SSID; a set of SSID-specific features indicative of one or more characteristics of the training SSID; and a set of training venue specific features indicative of one or more characteristics of the one or more training venue identifiers; and generate an inferred function based on the set of features, the inferred function being configured to determine a confidence parameter of a given pair including a given SSID received from the electronic device of the user paired to a given venue identifier, the confidence parameter representing a probability of an occurrence of a visit by the user to the venue associated with the given venue identifier.

In some non-limiting embodiments of the server, the processor is further configured to, at an in-use phase: receive, from the electronic device, a SSID previously accessed by the electronic device; receive, a first venue identifier and a second venue identifier based on the SSID; generate, a first pair comprising the SSID and the first venue identifier and a second pair comprising the SSID and the second venue identifier; determine, using the MLA, the confidence parameter of each of the first pair and second pair based on the set of linking features and the set of non-linking features associated with each of the first pair and the second pair; and in response to determining that the confidence parameter of the first pair is above the confidence parameter of the second pair, determine, the occurrence of the visit by the user to a venue associated with the first venue identifier In some non-limiting embodiments of the server, the first venue identifier is associated with a first venue location and the second venue identifier is associated with a second venue location, the processor being further configured to: receive, from the electronic device, an access location at which the SSID has been accessed by the electronic device; and receive the first venue identifier and the second venue identifier in response to the first venue location and the second venue location being within a predetermined distance from the access location.

In some non-limiting embodiments of the server, the processor being further configured to: receive an electronic device ID associated with the electronic device; determine a profile parameter of the user based on the electronic device ID, the profile parameter being indicative of profile characteristics of the user; in response to the determining the occurrence of the visit by the user to the venue, select a digital content item based on the profile parameter, the digital content item being associated with the venue; and transmit the digital content item to the electronic device for display.

In some non-limiting embodiments of the server, the processor being further configured to: receive, a training SSID location, the training SSID location corresponding to a geographical location associated with the training SSID; analyze a plurality of training venue identifiers, each of the training venue identifier included within the plurality of training venue identifiers being associated with a training venue location; and wherein to receive the one or more training venue identifiers comprises, the processor is configured to receive one or more training venue identifiers each having a respective training venue location in a predetermined distance from the training SSID location.

In some non-limiting embodiments of the server, to generate the positive training pair, the processor is configured to: pair the training SSID with the first training venue identifier in response to the training SSID location corresponding to the training venue location associated with the first training venue identifier; and wherein to generate the set of negative training pairs, the processor is configured to: pair the training SSID with at least the second training venue identifier in response to the training SSID location being different to the training venue location associated with the second training venue identifier.

In some non-limiting embodiments of the server, wherein for a given training venue identifier, the information associated with a given training venue comprises at least one of: a name of the training venue; an operating status of the training venue; a location of the training venue a category associated with the training venue; and one or more URLs associated with the training venue.

In the context of the present specification, the expression "information" includes information of any nature or kind whatsoever capable of being stored in a database. Thus information includes, but is not limited to audiovisual works (images, movies, sound records, presentations, etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

The article entitled "Labelling for Venue Visit Detection by Matching Wi-Fi Hotspots with Businesses" (D. Shaposhnikov, A. Bezzubtseva, E. Gladkikh, and A. Drutsa. 2019. *Labelling for Venue Visit Detection by Matching Wi-Fi Hotspots with Businesses*. In Proceedings of the 28th ACM International Conference on Information and Knowledge Management (CIKM '19). Association for Computing Machinery, New York, N.Y., USA, 2281-2284) provides additional background information, description of implementations of the non-limiting embodiments of the present technology, as well as some additional examples. The entirety of this article is incorporated herein by reference, in all those jurisdictions where such incorporation by reference is allowed.

DETAILED DESCRIPTION

Figure 1:
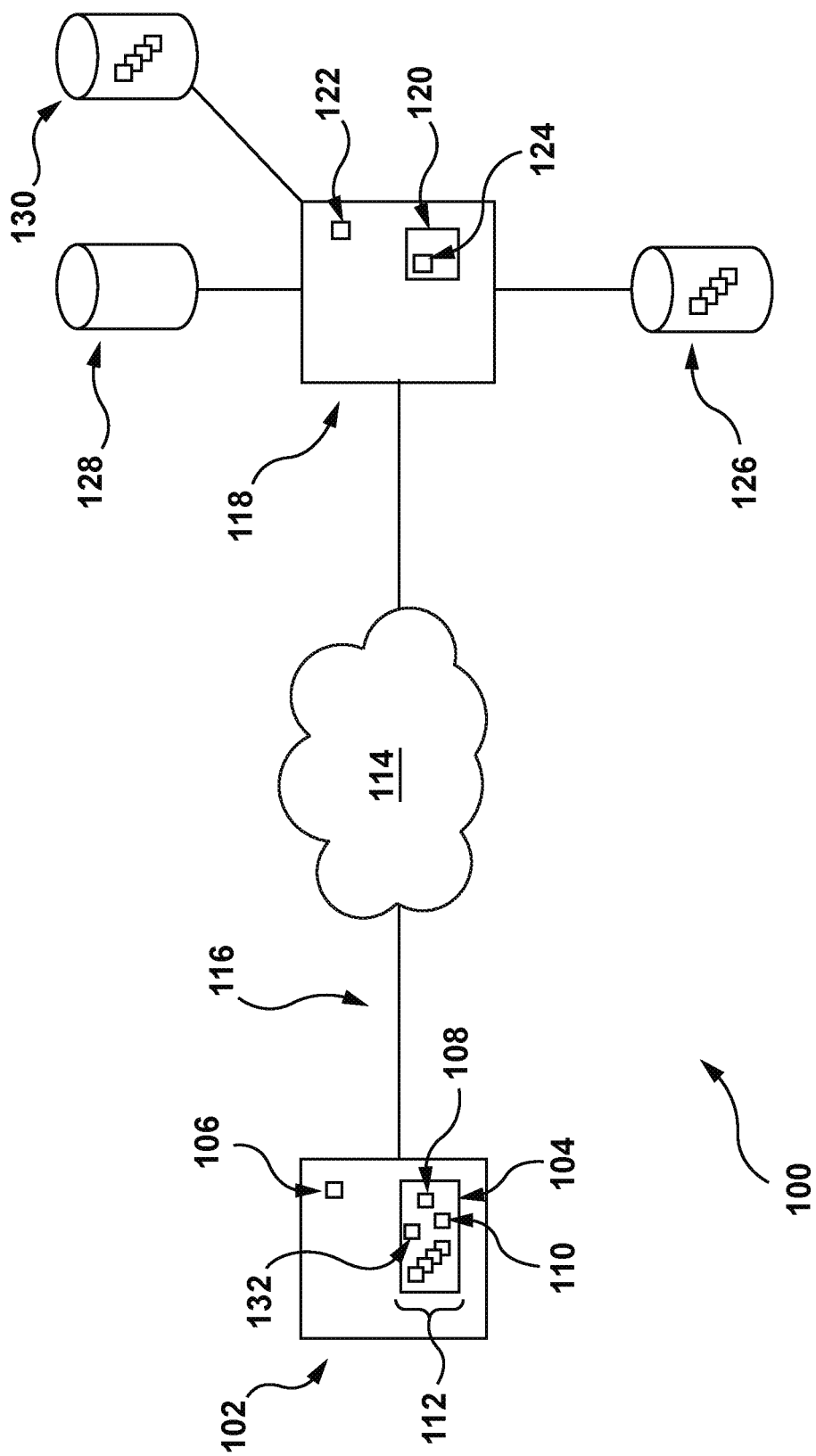
FIG. 1 is a schematic diagram depicting a system, the system being implemented in accordance with non-limiting embodiments of the present technology.

Referring to FIG. 1, there is shown a schematic diagram of a system 100, the system 100 being suitable for implementing non-limiting embodiments of the present technology. It is to be expressly understood that the system 100 is depicted merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope. Furthermore, as an aid to understanding, the following description may describe relatively simplified implementations of the present technology. As persons skilled in the art would understand, various implementations of the present technology may be of greater complexity.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labelled as a "processor" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some non-limiting embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

With these fundamentals in place, we will now consider some non-limiting examples to illustrate various implementations of aspects of the present technology.

The system 100 comprises an electronic device 102. The electronic device 102 is typically associated with a user (not depicted) and, as such, can sometimes be referred to as a "client device". It should be noted that the fact that the electronic device 102 is associated with the user does not mean to suggest or imply any mode of operation—such as a need to log in, a need to be registered or the like.

In the context of the present specification, unless provided expressly otherwise, "electronic device" is any computer hardware that is capable of running a software appropriate to the relevant task at hand. Thus, some (non-limiting) examples of electronic devices include personal computers (desktops, laptops, netbooks, etc.), smartphones, and tablets. It should be noted that a device acting as an electronic device in the present context is not precluded from acting as a server to other electronic devices. The use of the expression "an electronic device" does not preclude multiple client devices being used in receiving/sending, carrying out or causing to be carried out any task or request, or the consequences of any task or request, or steps of any method described herein.

The electronic device 102 includes a permanent storage 104. The permanent storage 104 may encompass one or more storage media and generally provides a place to store computer-executable instructions executable by a processor 106. By way of an example, the permanent storage 104 may be implemented as a computer-readable storage medium including Read-Only Memory (ROM), hard disk drives (HDDs), solid-state drives (SSDs), and flash-memory cards.

The electronic device 102 includes hardware and/or software and/or firmware (or a combination thereof) to execute a navigation application 108. Generally speaking, the purpose of the navigation application 108 is to enable the user to navigate from a given location to another location. The manner in which the navigation application 108 is implemented is known in the art and will not be described herein. Suffice to say that the navigation application 108 may be one of Yandex.Maps™ application, Yandex.Navigator™ application, or other commercial or proprietary navigation applications.

Irrespective of how the navigation application 108 is implemented, the navigation application 108 has access to a GPS receiver (not depicted) configured to receive GPS satellite signals and determine the position of the electronic device 102. Generally speaking, the electronic device 102 does not need to be connected to the Internet, nor be executing the navigation application 108, to receive the GPS satellite signals, and as such the electronic device 102 may be configured to track the movement of a user in the form of latitude and longitude irrespective of the availability of the Internet connection.

In some non-limiting embodiments of the present technology, the electronic device 102 includes a navigation log 110, which stores the GPS coordinates that have been collected during a time period when the navigation application 108 is active or running in the background. In some non-limiting embodiments, the navigation log 110 may further host the GPS coordinates that have been collected while the navigation application 108 is not in-use.

Figure 2:
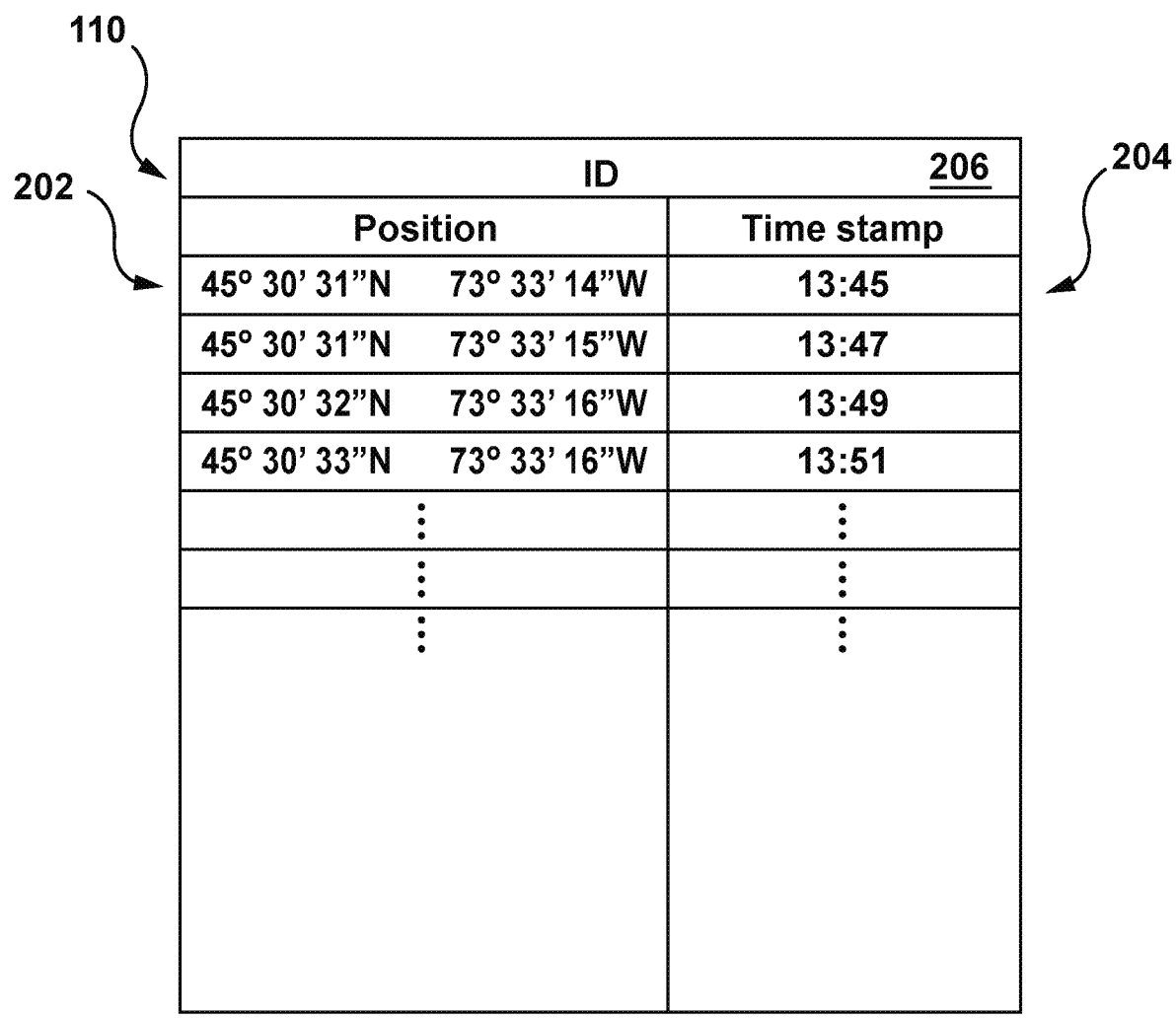
FIG. 2 is a non-limiting embodiment of a navigation log stored within an electronic device of FIG. 1.

With reference to FIG. 2, a non-limiting embodiment of the navigation log 110 is illustrated. The manner in which the navigation log 110 is populated is not limited. Just as an example, the navigation application 108 may be configured to receive the GPS satellite signals at predetermined time intervals, and convert the GPS satellite signals into GPS coordinates.

The navigation log 110 stores a first GPS coordinate 202 which corresponds to the location of the city hall of Montreal, Canada. The first GPS coordinate 202 is associated with a first timestamp 204. The first timestamp 204 corresponds to the time at which the electronic device 102 was at the first GPS coordinate 202.

The navigation log 110 further stores a plurality of GPS coordinates and associated time stamps (not separately numbered). For example, based on the time stamps and GPS coordinates within the navigation log 110, it should be understood that the electronic device 102 has moved 2 seconds north and 2 seconds west within 6 minutes. Although only four GPS positions are illustrated in the navigation log 110, it should be understood that the navigation log 110 may store more or fewer than four GPS positions.

In some non-limiting embodiments, the navigation application 108 is configured to assign a user device ID 206 to the navigation log 110. For example, the user device ID 206 may correspond to a proprietary ID number assigned by the navigation application 108 as well as other related one or more service applications 112 (described below). In some non-limiting embodiments, the navigation log 110 may further be associated with a user ID (not shown), which may correspond to a user name (such as an email address) associated with the user if the navigation application 108 requires signing-in.

Referring back to FIG. 1, the electronic device 102 includes hardware and/or software and/or firmware (or a combination thereof) to execute one or more service applications 112. Generally speaking, the one or more service applications 112 correspond to electronic applications accessible by the electronic device 102. In some non-limiting embodiments, the one or more service applications 112 include at least one service application (not numbered) that is operated by the same entity that has provided the afore-described navigation application 108. For example, if the navigation application 108 is Yandex.Navigator™ application, the one or more service applications 112 may include a Yandex.Browser™ browser application, a Yandex.News™ news application, a Yandex.Market™ market application, and the like. Needless to say, the one or more service applications 112 may also include service applications that are not operated by the same entity that has provided the afore-mentioned navigation application 108, and may include for example, the Vkontakte™ social media application, and the Spotify™ music streaming application.

In some non-limiting embodiments, the activities of the user executed on each of the one or more service applications 112 are collected by one or more associated web server (not shown), and are used to build a profile of the user associated with the electronic device 102. In some non-limiting embodiments, the one or more service applications 112 that are operated by the same entity as the navigation application 108 are configured to store the collected activities with an indication of the user device ID 206.

In some non-limiting embodiments of the present technology, the electronic device 102 stores, within the permanent storage 104 a Service Set Identifier (SSID) log 132, which stores the SSID of the Wireless Fidelity (Wi-Fi) hotspots it has previously accessed.

The manner in which the SSID log 132 is populated is not limited. Just as an example, in response to the electronic device 102 connecting to a Wi-Fi hotspot, the processor 106 may be configured to store the associated SSID within the SSID log 132 together with a time stamp at which the associated Wi-Fi hotspot has been accessed.

The electronic device 102 comprises a communication interface (not depicted) for enabling two-way communication with a communication network 114 via a communication link 116. In some non-limiting embodiments of the present technology, the communication network 114 can be implemented as the Internet. In other embodiments of the present technology, the communication network 114 can be implemented differently, such as any wide-area communication network, local area communications network, a private communications network and the like.

How the communication link 116 is implemented is not particularly limited and depends on how the electronic device 102 is implemented. Merely as an example and not as a limitation, in those embodiments of the present technology where the electronic device 102 is implemented as a wireless communication device (such as a smart phone), the communication link 116 can be implemented as a wireless communication link (such as, but not limited to, a 3G communications network link, a 4G communications network link, a Wireless Fidelity, or Wi-Fi®, for short, Bluetooth®, or the like) or wired (such as an Ethernet based connection).

It should be expressly understood that implementations for the electronic device 102, the communication link 116 and the communication network 114 are provided for illustration purposes only. As such, those skilled in the art will easily appreciate other specific implementational details for the electronic device 102, the communication link 116, and the communication network 114. As such, by no means the examples provided hereinabove are meant to limit the scope of the present technology.

The system 100 further includes a server 118 coupled to the communication network 114. The server 118 can be implemented as a computer server. In an example of an embodiment of the present technology, the server 118 can be implemented as a Dell™ PowerEdge™ Server running the Microsoft™ Windows Server™ operating system. Needless to say, the server 118 can be implemented in any other suitable hardware and/or software and/or firmware or a combination thereof. In the depicted non-limiting embodiment of the present technology, the server 118 is a single server. In alternative non-limiting embodiments of the present technology, the functionality of the server 118 may be distributed and may be implemented via multiple servers.

The server 118 includes a communication interface (not depicted) structured and configured to communicate with various entities (such as the electronic device 102 and other devices potentially coupled to the communication network 114) via the communication network 114. The server 118 includes a server memory 120 which includes one or more storage media and generally provides a place to store computer-executable program instructions executable by a server processor 122. By way of example, the server memory 120 may be implemented as a tangible computer-readable storage medium including Read-Only Memory (ROM) and/or Random-Access Memory (RAM). The server memory 120 may also include one or more fixed storage devices in the form of, by way of example, hard disk drives (HDDs), solid-state drives (SSDs), and flash-memory cards.

In some non-limiting embodiments, the server 118 can be operated by the same entity that has provided the afore-described navigation application 108. For example, if the navigation application 108 is a Yandex.Navigator™ application, the server 118 can be operated by Yandex LLC of Lev Tolstoy Street, No. 16, Moscow, 119021, Russia. In alternative embodiments, the server 118 can be operated by an entity different from the one that has provided the aforementioned navigation application 108.

In accordance with the non-limiting embodiments of the present technology, the server 118 is configured to execute a matching application 124. The manner in which the matching application 124 is implemented is described in detail below.

To that end, the server 118 is communicatively coupled to a venue database 126. In alternative non-limiting embodiments, the venue database 126 may be communicatively coupled to the server 118 via the network 114. Although the venue database 126 is illustrated schematically herein as a single entity, it is contemplated that the venue database 126 may be configured in a distributed manner.

The venue database 126 is populated with a plurality of venue identifiers (not separately numbered). Broadly speaking, a venue identifier may include information associated with a given type of venue, such as for example, a venue associated with a business, a non-profit organization, a park, or any other points of interests. For example, a venue identifier may include a name associated with the given type of venue, a location, an operating status and the like (described in more detail below).

Venue Database 126

Figure 3:
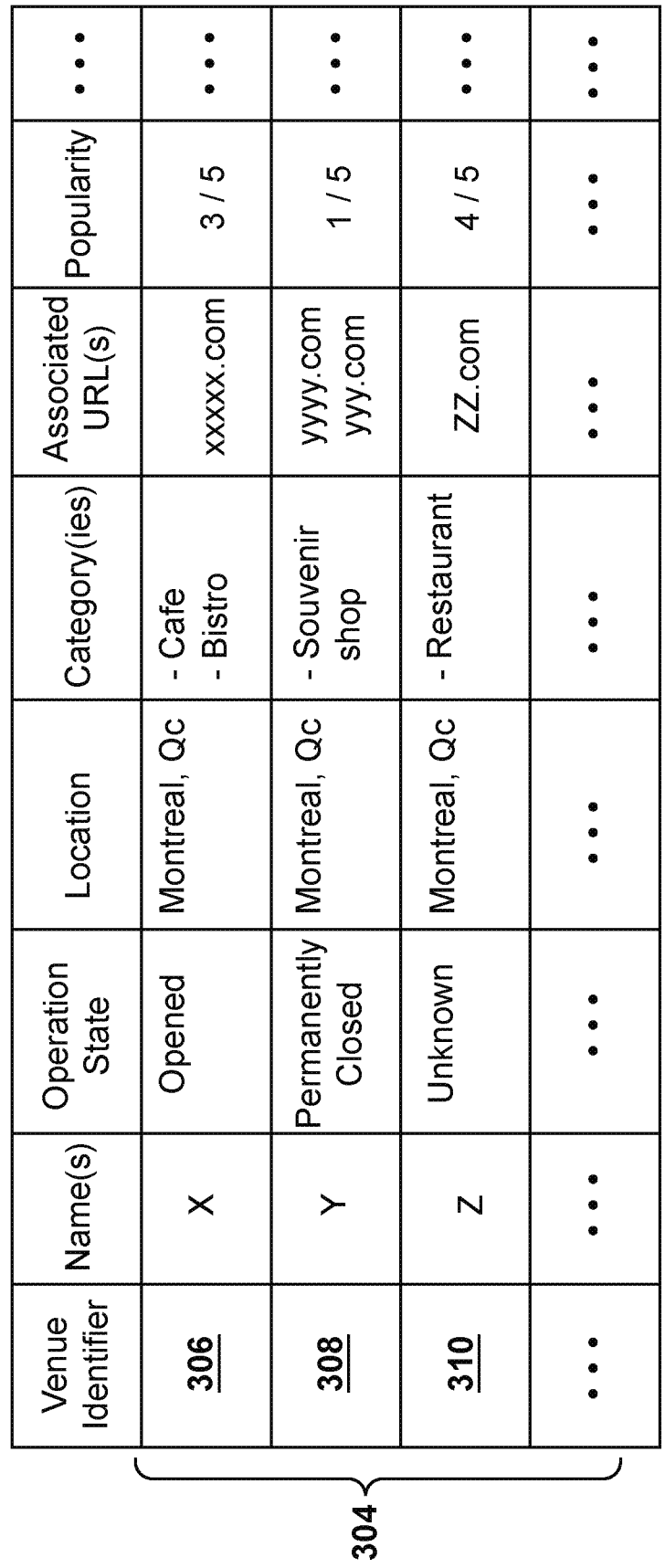
FIG. 3 is a schematic illustration of a list of venue indications populated within a venue database of FIG. 1.

With reference to FIG. 3, there is depicted a non-limiting schematic illustration of the venue database 126 that is populated with the plurality of venue identifiers.

The manner in which the venue database 126 is populated is not limited. Just as an example, the venue database 126 may be populated using a crawler (not depicted), configured to crawl business review websites, such as the Yelp™ business review website, the TripAdvisor™ travel service website, and the like.

The database 126 stores a list 302 of venues with respective information implemented as a plurality of venue identifiers 304. The plurality of venue identifiers comprises a first venue identifier 306, a second venue identifier 308 and a third venue identifier 310. Although only three venue identifiers are illustrated, it is not limited as such, and the list 302 may include more or fewer than three venue identifiers.

Each of the plurality of venue identifiers (i.e. the first venue identifier 306, the second venue identifier 308, and the third venue identifier 310) includes information regarding a particular venue.

For example, taking the first venue identifier 306 as an example, it is associated with a business venue named "X". For the avoidance of any doubt, it should be mentioned that the business venue name is represented by "X", however, in reality the business venue name is made of letters or words in a given language (for example, in English).

The first venue identifier 306 further includes additional information regarding the business venue "X", such as its operating status, its location (which may be expressed in the form of longitudinal and latitude coordinates or a street address), one or more category(ies) associated with the business venue "X" (for example, a main category associated with the business venue "X", and one or more sub-categories associated with the business venue "X"), one or more URL(s) associated with the business venue "X" and a popularity of the business venue "X".

Needless to say, it is contemplated that additional information may be included in the first venue identifier 306. For example, the first venue identifier 306 may further include (i) a venue precision level parameter, which is indicative of a confidence in the location of the business venue name "X", (ii) one or more additional name variations associated with the business venue name "X", (iii) whether the location of the business venue is nested, or provided within another venue (such as a mall), and the like.

With continued reference to FIG. 1, the server 118 is further coupled to a user profile database 128 via a dedicated link (not numbered). In alternative non-limiting embodiments of the present technology, the user profile database 128 may be communicatively coupled to the server 118 via the communication network 114. Although the user profile database 128 is illustrated schematically herein as a single entity, it is contemplated that the user profile database 128 may be configured in a distributed manner.

Generally speaking, the user profile database 128 is a repository of one or more user profiles (not illustrated). How the one or more user profiles are implemented is not limited, and may for example be a set of vectors representing the interests of a given user.

Figure 4:
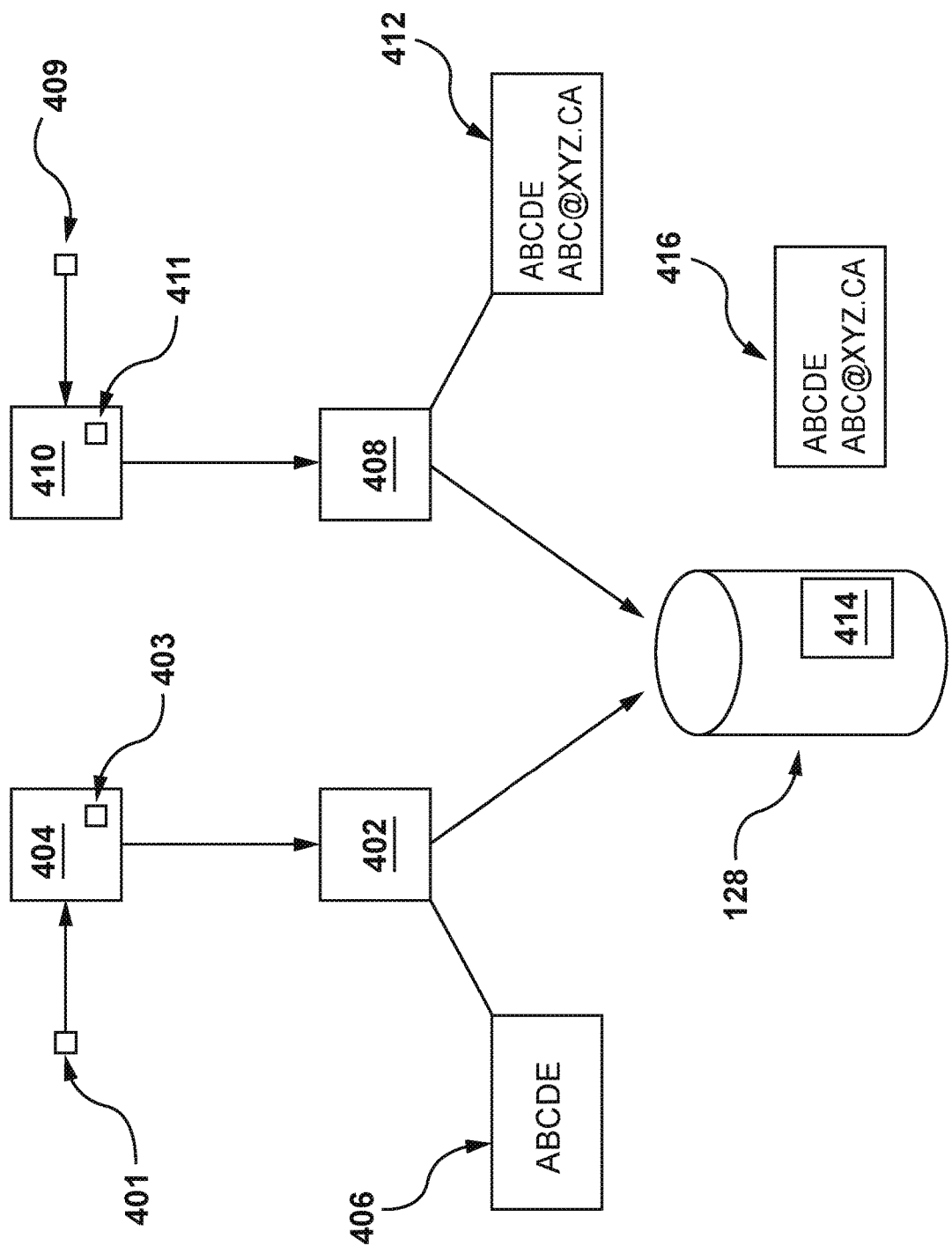
FIG. 4 depicts schematic diagram of a process for generating an aggregated user profile.

With reference to FIG. 4, a schematic illustration of a process for the aggregation of different user interest profiles associated with the user of the electronic device 102 is depicted.

A first profile 402 is received from a first service server 404. For example, the first service server 404 may be associated with a first service application 401 that corresponds to the Yandex.Browser™ browser application, which is operated by the same entity providing the aforementioned navigation application 108. The first profile 402 may be generated by the first service server 404 based on browsing log 403 associated with the electronic device 102.

The first profile 402 is associated with a first set of unique IDs 406. For example, the first set of unique IDs 406 may include a proprietary user ID assigned to the electronic device 102 by the first service application 401. Recalling that the first service application 401 is operated by the same entity providing the aforementioned navigation application 108, the first set of unique IDs 406 includes the user device ID 206 (corresponding to "ABCDE").

A second profile 408 is received from a second service server 410. For example, the second service server 410 may be associated with a second service application 409 that corresponds to the Yandex.Market™ market application, which is operated by the same entity providing the aforementioned navigation application 108. The second profile 408 may be generated by the second service server 410 based on search logs 411 associated with the electronic device 102.

The second profile 408 is also associated with a second set of unique IDs 412. Recalling that the second service application 409 is operated by the same entity providing the aforementioned navigation application, the second set of unique IDs 412 includes the user device ID 206 ("ABCDE"). Additionally, the second set of unique IDs 412 may also include the email address of the user used for sign-in ("ABC@XYZ.CA"). In some non-limiting embodiments, the second profile 408 further includes a public profile picture (not depicted) of the user associated with the electronic device 102.

In some non-limiting embodiments, if the second service application 409 has been accessed by the same user but on another device than the electronic device 102, the second set of unique IDs 412 further includes another proprietary device ID (not shown) assigned to the other device.

The user profile database 128 is configured to execute a profile aggregation routine (not depicted). The profile aggregation routine is configured to determine if the first profile 402 and the second profile 408 correspond to the same user. For example, the profile aggregation routine may be configured to determine if the first set of unique IDs 406 corresponds, at least partially, to the second set of unique IDs 412.

If it is determined that the first set of unique IDs 406 corresponds at least partially to the second set of unique IDs 412, the profile aggregation routine is configured to aggregate the first profile 402 and the second profile 408 to generate an aggregated user profile 414.

As a result of the execution of the profile aggregation routine, the user profile database 128 stores the aggregated user profile 414 together with a list of associated unique IDs 416 (which includes the user device ID 206 and the email address), and, if present, with the profile picture of the associated user (not depicted).

On the other hand, if the profile aggregation routine determines that the first set of unique IDs 406 does not correspond even partially to the second set of unique IDs 412, the first profile 402 and the second profile 408 are considered to be associated with different users. Consequently the user profile database 128 stores the first profile 402 (and the first set of unique IDs 406) and the second profile 408 (and the second set of unique IDs 412) separately.

Needless to say, although only two user profiles (the first profile 402 and the second profile 408) are illustrated to generate the aggregated user profile 414, it should be understood that the aggregated user profile 414 may be generated based on more than two user profiles.

Moreover, although the aggregated user profile 414 has been generated based solely on service applications that are operated by the same entity, it is not limited as such. Given that the second profile 408 includes the email address associated with the user, it is possible to further aggregate the user's profile with a third profile (not shown) that is received from a different entity, provided that the third profile is also associated with a unique ID that corresponds to the same email address as the one included within the list of associated unique IDs 416.

With continued reference to FIG. 1, the server 118 is further coupled to a digital content item database 130. In alternative embodiments, the digital content item database 130 may be communicatively coupled to the server 118 via the communication network 114. Although the digital content item database 130 is illustrated schematically herein as a single entity, it is contemplated that the digital content item database 130 may be configured in a distributed manner.

The digital content item database 130 is populated with a plurality of digital content items (not separately numbered). The nature of each of the plurality of digital content item is not particularly limited. Broadly speaking, a digital content item may correspond to an advertisement, comprising one or more sentences, images, videos, etc.

Digital Content Item Database 130

Figure 5:
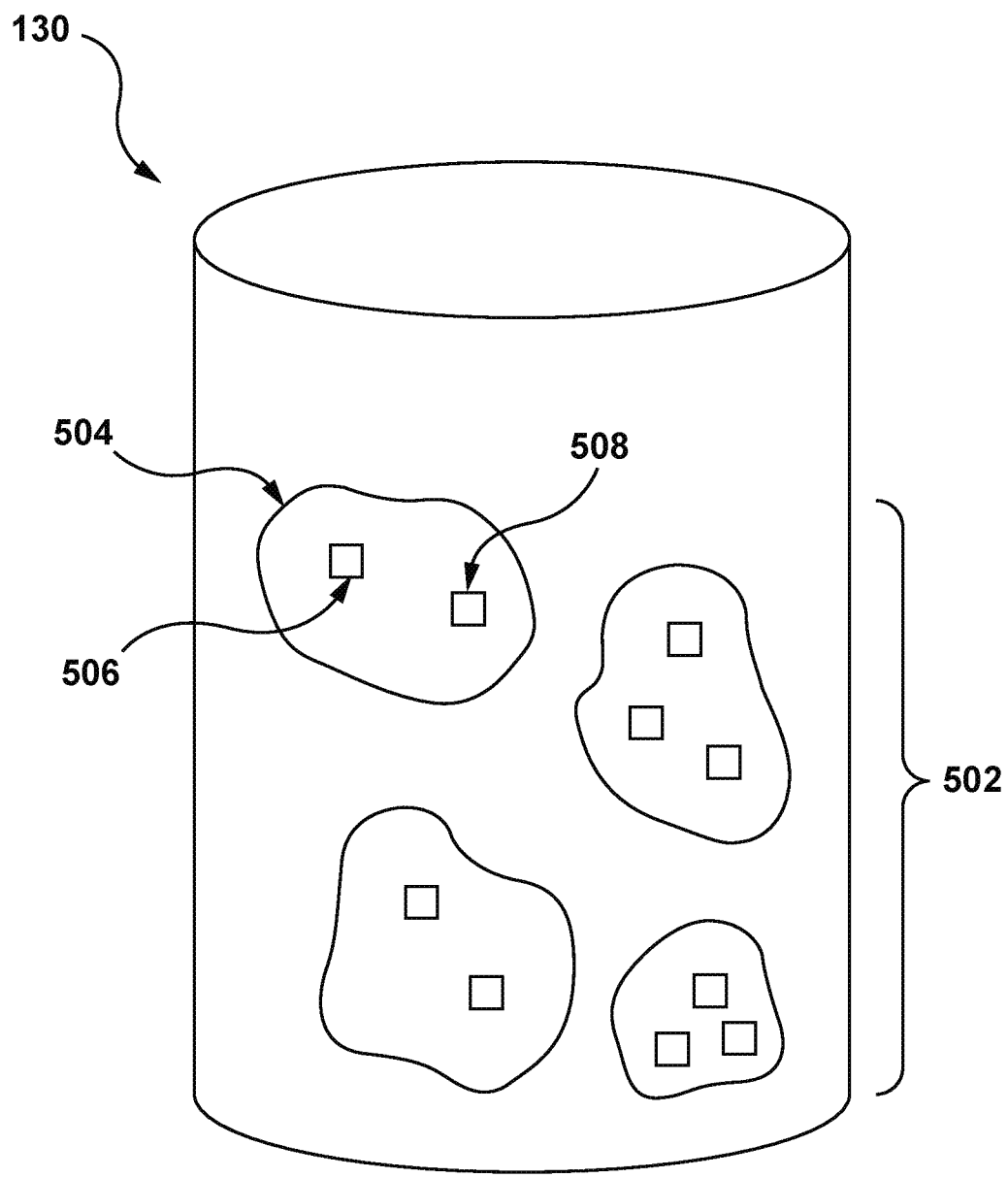
FIG. 5 is a schematic illustration of a digital content item database of FIG. 1 populated with the plurality of digital content items.

With reference to FIG. 5, a non-limiting schematic illustration of the digital content item database 130 populated with the plurality of digital content items is illustrated.

The manner in which the digital content item database 130 is populated is not limited. Just as an example, the digital content item database 130 may receive the digital content items from one or more venues or advertisers associated with a venue.

The plurality of digital content items is clustered into one or more venue clusters 502. More precisely, the digital content item database 130 stores a first venue cluster 504, a second venue cluster (not numbered), a third venue cluster (not numbered) and a fourth venue cluster (not numbered). For example, the first venue cluster 504 may be associated with the venue associated with the first venue identifier 306 (see FIG. 3), which stores a first digital content item 506 and a second digital content item 508.

In some non-limiting embodiments of the present technology, the digital content item database 130 includes additional information in respect to each of the plurality of digital content items, such as the duration of the digital content item, target parameters selected by a source of the digital content item, a minimum bidding price for each impression to a user aligned with the target parameters, indication of the digital content item being static or dynamic, and the like.

Although the description of the system 100 has been made with reference to various hardware entities (such as the electronic device 102, the server 118, the venue database 126, the user profile database 128 and the digital content item database 130 and the like) depicted separately, it should be understood that this is done for ease of understanding. It is contemplated that the various functions executed by these various entities be executed by a single entity or be distributed among different entities.

Matching Application 124

Figure 6:
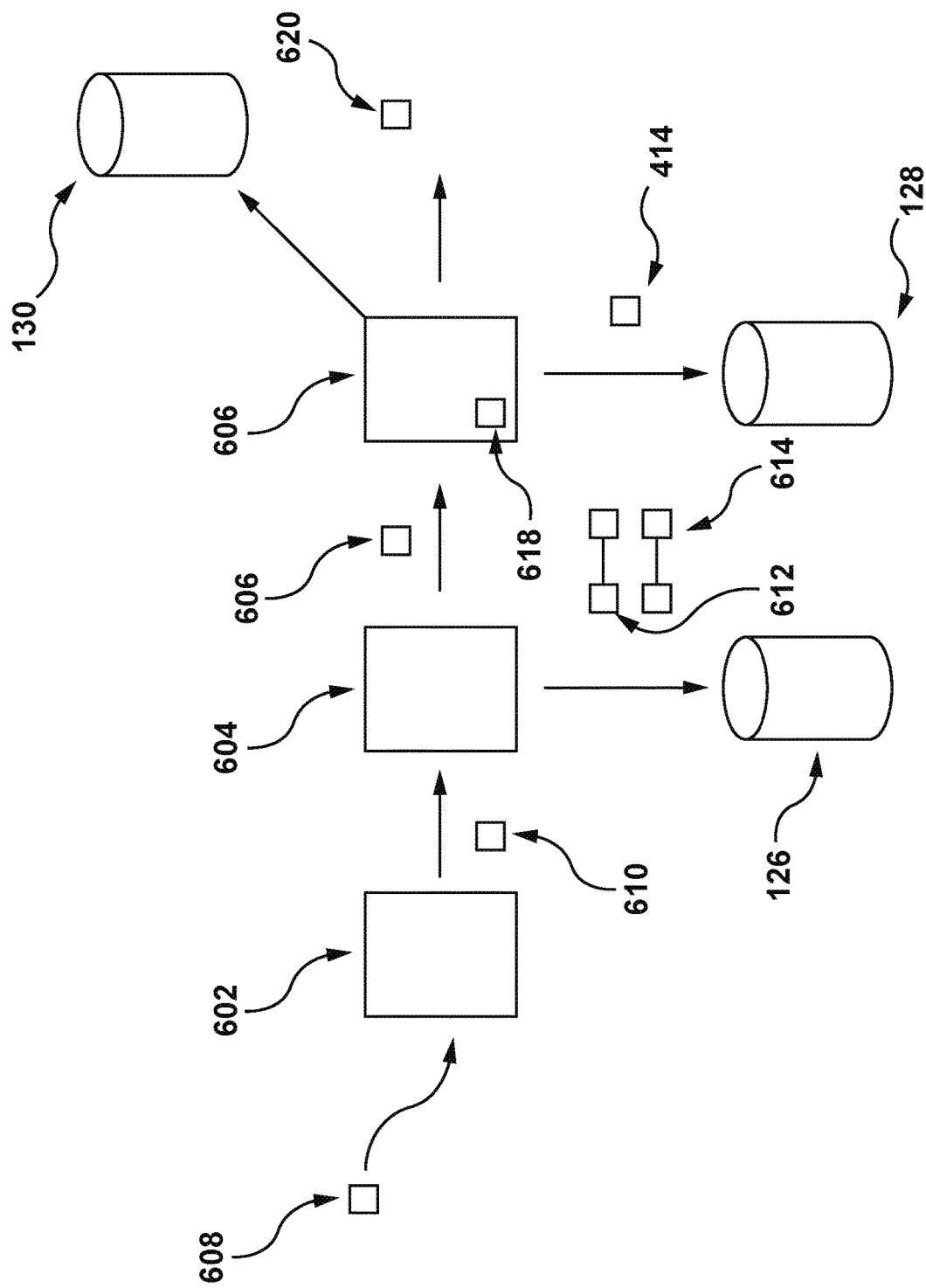
FIG. 6 depicts an example of a process of determining an occurrence of a visit to a venue by a user.

With reference to FIG. 6, a schematic illustration of the operation the matching application 124 in accordance with non-limiting embodiments of the present technology is depicted. The matching application 124 executes (or otherwise has access to): a receiving routine 602, a pairing routine 604, and a determining routine 606.

In the context of the present specification, the term "routine" refers to a subset of the computer executable program instructions of the matching application 124 that is executable by the server processor 122 to perform the functions explained below in association with the various routines (the receiving routine 602, the pairing routine 604, and the determining routine 606). For the avoidance of any doubt, it should be expressly understood that the receiving routine 602, the pairing routine 604, and the determining routine 606 are illustrated schematically herein as separate entities for ease of explanation of the processes executed by the matching application 124. It is contemplated that some or all of the receiving routine 602, the pairing routine 604, and the determining routine 606 may be implemented as one or more combined routines.

For ease of understanding the present technology, functionality of each one of the receiving routine 602, the pairing routine 604, and the determining routine 606, as well as data and/or information processed or stored therein are described below.

The following description of the functionality of each one of the receiving routine 602, the pairing routine 604 and the determining routine 606 is primarily made from the perspective of an in-use phase of the matching application 124. However, for ease of understanding the present technology, reference to one or more training phase(s) to better understand the one or more functionalities used in the in-use phase have also been included.

Receiving Routine 602—in Use

The receiving routine 602 is configured to receive a data packet 608 from the electronic device 102.

For example, the data packet 608 includes the SSID log 132, the navigation log 110, and the user device ID 206 of the electronic device 102.

In some non-limiting embodiments of the present technology, the electronic device 102 is configured to transmit the data packet 608 to the receiving routine 602 on a periodical basis, such as every hour, every day, and so on.

The receiving routine 602 is then configured to access the SSID log 132, and determine if the electronic device 102 has connected to one or more Wi-Fi hotspots between a first time (for example, 10:35 AM) and a second time (for example, 2:35 PM). How the first time and the second time are determined is not limited. For example, the first time may correspond to a time succeeding the previously transmitted SSID log 132, and the second time may correspond to the time at which the data packet 608 is transmitted to the receiving routine 602.

Let us assume for example, that within a period of time defined between the first time and the second time, the electronic device 102 has connected to two Wi-Fi hotspots, each having a respective SSID, namely a first SSID entitled "Joe_Cafe" and a second SSID entitled "Netgear-1234".

In some non-limiting embodiments of the present technology, the receiving routine 602 is configured to filter out any non-venue SSID that was accessed by the electronic device 102. In other words, the receiving routine 602 is configured to determine if the SSID corresponds to a non-venue SSID, such as, for example "AndroidAP", "John's Iphone" and the like, which are residential or smartphone hotspots, and discard the non-venue SSID. How the receiving routine 602 is configured to determine whether a given SSID corresponds to a non-venue SSID is not limited, and may for example be by examining the textual string of the given SSID to identify any personal name, device name, and/or a portion of a name of a manufacturer of a wireless access point (WAP) (such as Cisco Systems Inc., Netgear Inc., and the like).

Let us assume that the receiving routine 602 has determined that the second SSID entitled "Netgear-1234" corresponds to a non-venue SSID. The receiving routine 602 is then configured to discard the second SSID and proceeds to the following functions with regards to the first SSID entitled "Joe_Cafe".

In some non-limiting embodiments of the present technology, the receiving routine 602 may have access to a list of known venue names (not shown) to positively check if the first SSID corresponds to a venue SSID. For example, the receiving routine 602 may have access to a directory of businesses, such as the Yellow Pages™ directory, and is configured to determine if the words included in the first SSID is also found within the list of known venue names. For example, the determination routine 602 is configured to access the list of known venue names and if there is an entry of a business entitled "Joe's cafe" (which includes both word of the first SSID), the determination routine 602 is configured to determine that the first SSID corresponds to a venue SSID.

Needless to say, where a given SSID comprises a plurality of words, it is not necessary for all the words to be included within the list of known venue names to make the determination. Indeed, it is contemplated that the determination routine 602 be configured to determine if the given SSID corresponds to a venue SSID if a predetermined number, or portion thereof, is also found within the list of known venue names.

In some non-limiting embodiments of the present technology, the receiving routine 602 may be configured to store indications of the SSIDs that were previously collected by the receiving routine 602, and determine whether a given SSID is a venue SSID. More precisely, the receiving routine 602 is configured to determine that the given SSID corresponds to a venue SSID if a predetermined number of electronic devices have previously accessed the given SSID. This is based on the assumption that only a limited number of devices will have accessed a non-venue SSID (such as a residential or smartphone hotspots) compared to a venue SSID. How the predetermined number is determined is not limited, and may for example be empirically determined.

The receiving routine 602 is configured to determine the time stamp associated with the first SSID entitled "Joe_Cafe", and, based on the time stamp, determine an access location at which the user accessed the first SSID based on the navigation log 110. For example, the access location may be represented in the form of latitude and longitude coordinates.

The receiving routine 604 is then further configured to transmit a data packet 610 to the pairing routine 604. The data packet 610 includes the first SSID entitled "Joe_Cafe", the access location, and the user device ID 206.

Pairing Routine—in Use

In response to receiving the data packet 610, the pairing routine 604 is configured to execute the following functions.

Firstly, the pairing routine 604 is configured to access the venue database 126 and retrieve from the list 302, one or more venue identifiers (such as the first venue identifier 306, the second venue identifier 308, the third venue identifier 310 and the like), that are associated with a respective location that is a predetermined distance from the access location. For example, the predetermined distance may correspond to 45 metres, 75 metres and the like.

Let us assume, for the purpose of the example, that within the list 302, only the first venue identifier 306 and the second venue identifier 308 are associated with a location that is within the predetermined distance, and the remainder of the venue identifiers (such as the third venue identifier 310) is outside of the predetermined distance. Needless to say, although only two venue identifiers are within the predetermined distance, it is contemplated that only one, or more than two venue identifiers be within the predetermined distance.

As such, the pairing routine 604 is configured to retrieve the first venue identifier 306 and the second venue identifier 308 from the venue database 126.

The pairing routine 604 is then configured to generate a first pair 612 comprising the first SSID "Joe_Cafe" paired with the first venue identifier 306, and a second pair 614 comprising the first SSID "Joe_Cafe" paired with the second venue identifier 308.

The pairing routine 604 is then configured to transmit a data packet 616 to the determining 606. The data packet 616 includes the first pair 612, and the second pair 614. In some non-limiting embodiments of the present technology, the data packet 616 further includes the user device ID 206.

Determining Routine 606—in Use

In response to receiving the data packet 616, the determining routine 606 is configured to execute the following functions.

Firstly, the determining routine 606 is configured to execute a machine learning algorithm (MLA) 618 that is trained to assign a confidence parameter to each of the first pair 612 and the second pair 614 (described in detail below).

As it will be more described below, how the MLA 618 is trained to assign the confidence parameter to each of the first pair 612 and the second pair 614 will not be described in detail now. For now, suffice to say that the confidence parameter is indicative of a probability of the first SSID corresponding to the venue associated with each of the first pair 612 and the second pair 614.

In other words, taking the first pair 612 as an example (the first SSID paired with the first venue identifier 306), the confidence parameter is indicative of the probability of the first SSID being associated with a Wi-Fi hotspot provided by the venue associated with the first venue identifier 306. As such, a higher confidence parameter is indicative that the user has visited the venue associated with the first venue identifier 306.

MLA 618—Training Phase

Figure 7:
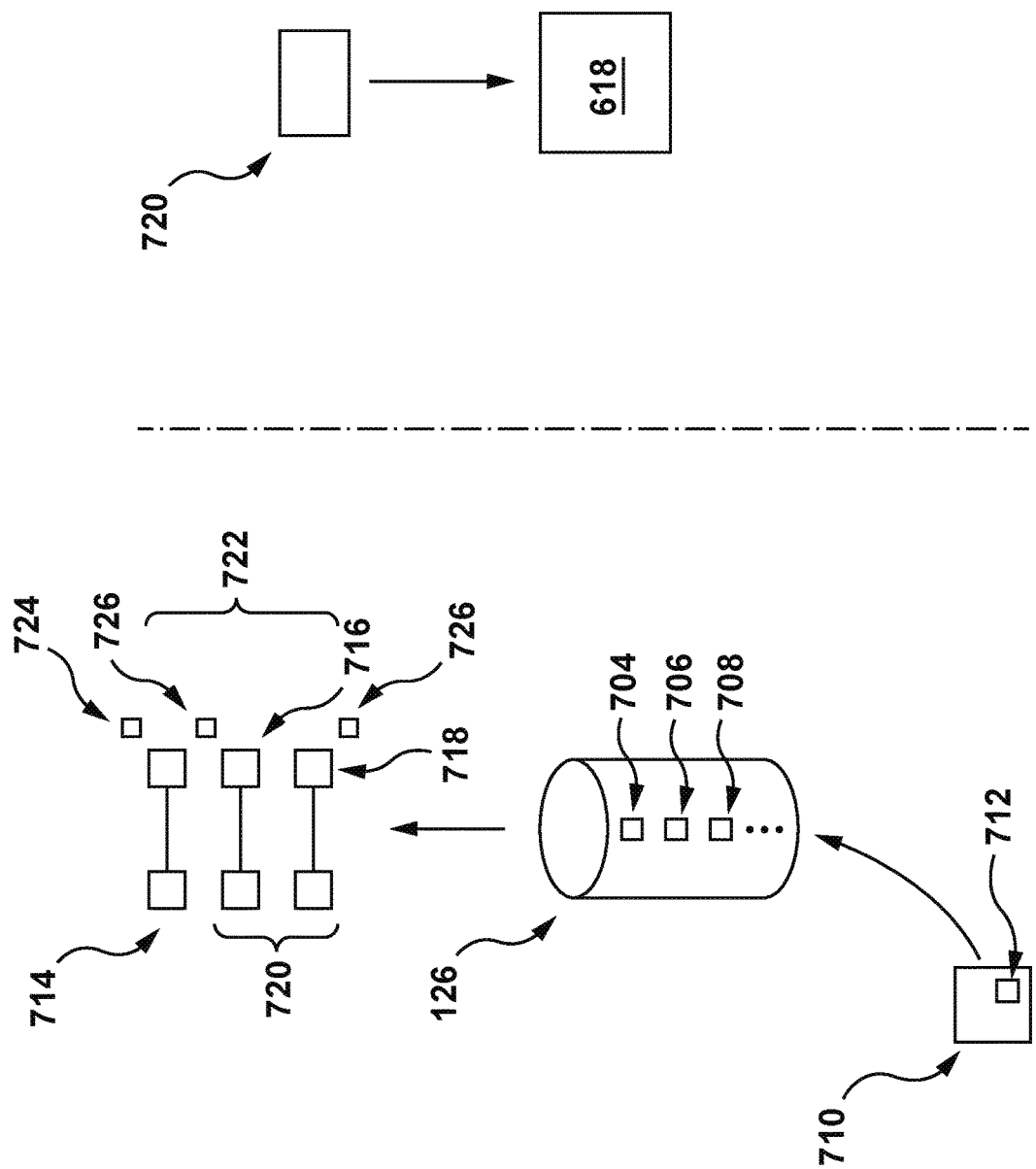
FIG. 7 depicts an example of a process for training a machine learning algorithm used for executing the process of FIG. 6.

With reference to FIG. 7, a schematic illustration of a process of training the MLA 618 is depicted.

For a better understanding of the underlying concepts of the present technology, it should be understood that the training of the MLA 618 can be broadly separated into a first phase and a second phase. In the first phase, the training input data (discussed below) is generated. In the second phase, the MLA 618 is trained using the training input data. Moreover, although the steps of training the MLA 618 is explained as being executed by the determining routine 606.

How the training input data is generated will now be explained, which begins with the venue database 126. As recalled, the venue database 126 includes the list 302 of one or more venue identifiers. For the purpose of explaining the training phase, reference will be made to one or more "training venue identifiers" that are stored within the venue database 126. It should be expressly understood that these training venue identifiers need not be different from the venue identifiers explained previously with reference to FIG. 3. In other words, the training venue identifiers may be stored within the venue database 126 using the same manner as described above, and each of the training venue identifier stored within the venue database is associated with a real-time venue.

For the purpose of illustration it should be assumed that the venue database 126 includes a first training venue identifier 704, a second training venue identifier 706, and a third training venue identifier 708. Moreover, let us assume that the first training venue identifier 704, the second training venue identifier 706 and the third training venue identifier 708 are different from the first venue identifier 306, the second venue identifier 308 and the third venue identifier 310.

The determining routine 606 is configured to receive a data packet 710, which includes a training SSID 712. The training SSID 712 corresponds to a SSID known to be associated with a venue associated with one of the training venue identifiers.

How the training SSID 712 is known to be associated with the venue associated with one of the training venue identifiers is not limited. In some non-limiting embodiments of the present technology, the training SSID 712 may be received from an owner (such as the business owner) of a given training venue associated with one of the training venue identifiers. In some non-limiting embodiments of the present technology, the training SSID 712 may be received from a crowdsourcing platform, such as the Yandex.Toloka™ platform, where workers are tasked with visiting a venue associated with one of the training venue identifiers and provide the associated SSID.

In some non-limiting embodiments of the present technology, the data packet 710 further includes a location at which the training SSID 712 has been collected by the owner and/or the worker.

Let us assume for example, that the training SSID 712 is associated with the first training venue identifier 704. In other words, the training SSID 712 corresponds to the SSID of a hotspot provided at a venue associated with the first training venue identifier 704. The determining routine 606 is then configured to pair the training SSID 712 with the first training venue identifier 704 to generate a positive training pair 714.

The determining routine 606 is then configured to retrieve one or more training venue identifiers stored within the database 126 that are located near a location of the first training venue identifier 704, but are not or different from the location of the training SSID 712. For example, the determining routine 606 may be configured to retrieve the second training venue identifier 706 and the third training venue identifier 708, which are both associated to a respective location within a predetermined distance of the venue associated with the first training venue identifier 704. How the predetermined distance is implemented is not limited, and may correspond to, for example, 45 metres, 75 metres, and the like, from the location of the venue associated with the first training venue identifier 704.

Needless to say, although only two training venue identifiers (i.e. the second training venue identifier 706 and the third training venue identifier 708) have been retrieved, it is merely done for ease of illustration and it is contemplated that only a single training venue identifier or more than two training venue identifiers be retrieved.

The determining routine 606 is further configured to pair the training SSID 712 with the second training venue identifier 706 to generate a first negative training pair 716, and pair the training SSID 712 with the third training venue identifier 708 to generate a second negative training pair 718.

Unlike the positive training pair 714 which comprises the training SSID 712 and the first training venue identifier 704 known to be associated with the training SSID, each of the negative training pairs (i.e. the first negative training pair 716 and the second negative training pair 718) includes a respective training venue identifier that is known not to be associated with the training SSID 712.

The negative training pairs (i.e. the first negative training pair 716 and the second negative training pair 718) together form a set of negative training pairs 720. The set of negative training pairs and the positive training pair 714 together form a set of training data 722.

In some non-limiting embodiments of the present technology, the ratio of the positive training pair 714 to the negative training pairs within the set of training data 722 is 1 to 40. Needless to say, other ratios of the positive training pair 714 to the negative training pairs within the set of training data 722 may be used.

In some non-limiting embodiments of the present technology, the determining routine 606 is further configured to assign a label to each training pair included within the set of training data 722. More precisely, the determining routine 606 is configured to assign a label indicative of whether each training pair is a positive training pair or a negative training pair.

In some non-limiting embodiments of the present technology, the label is a binary label. For example, the determining routine 606 is configured to assign a first label 724, having a binary label value of 1 to the positive training pair 714, and a second label 726, having a binary label value of 0, to each of the first negative training pair 716 and the second negative training pair 718.

How the MLA 618 is trained using the set of training data 722 is now explained.

The set of training data 722 is inputted into the MLA 618. The MLA 618 includes a training logic to determine a set of features associated with each training pairs (such as the positive training pair 714) and the assigned label (such as the first label 724).

How the MLA 618 is implemented is not limited. In some non-limiting embodiments of the present technology, the MLA 618 is implemented as a Friedman's gradient boosting algorithm.

In some non-limiting embodiments of the present technology, the set of features are representative of the properties of the training SSID 712 and each of the training venue identifiers (i.e. the first training venue identifier 704, the second training venue identifier 706 and the third training venue identifier 708).

In some non-limiting embodiments of the present technology, the set of features may include a first set of features and a second set of features. The first set of features comprises one or more features indicative of one or more relational properties between the training SSID 712 and each of the one or more training venue identifiers (described in more detail below). On the other hand, the second set of features comprises one or more features indicative of one or more properties of the training and SSID 712 and each of the one or more training venue identifiers, individually (described in more detail below).

First Set of Features

In some non-limiting embodiments of the present technology, the first set of features corresponds to a set of features indicative of a relational linkage between each of the one or more training venue identifiers and the training SSID 712 and may, for example, include locational relationship(s) between the training SSID 712 and the one or more training venue identifiers, and/or textual relationship(s) between the training SSID 712 and the various information associated with the one or more training venue identifiers.

Taking the positive pair 714 as an example, the set of linking features may include one or more of, but not limited to:

A distance between a location associated with the first training venue identifier 704 and the location at which the training SSID 712 has been collected;

A percentage of the characters within the training SSID 712 included within a venue name associated with the first training venue identifier 704;

A cosine similarity between character frequency vectors of the venue name and the training SSID 712;

A percentage of the training SSID 712 trigram also present in the venue name;

A sum of the training SSID 712 name trigram term frequencies (TFs) multiplied by a global venue name trigram sequence inverse document frequency (IDF);

A cosine similarity between trigram frequency vectors of the venue name and the training SSID 712;

A cosine similarity between lexical token TF-IDF vectors of URLs associated with the first training venue identifier 704 and the training SSID 712;

A number of training SSID 712 lexical tokens also present in the venue name, the URLs and the category associated with the first training venue identifier 704;

A cosine similarity between the training SSID 712 tokens and the venue name, the URLs and the category tokens associated with the first training venue identifier 704;

A sum of the training SSID 712 lexical token TFs multiplied by a global venue URL token IDFs;

A sum of the training SSID 712 lexical token TFs multiplied by a global venue name token IDFs;

A cosine similarity between a lexical token frequency vectors of the venue name and the training SSID 712;

A cosine similarity between the lexical token frequency vectors of the URLs and the training SSID 712; and A cosine similarity between lexical token TF-IDF vectors of the venue name and the training SSID 712.

Second Set of Features

In some non-limiting embodiments of the present technology, the second set of features can be subdivided into a first subset of features and a second subset of features. Each of the first subset of features and the second subset of features comprises one or more features indicative of properties of the one of the training SSID 712 and the training venue identifiers.

In some non-limiting embodiments of the present technology, the first subset of features corresponds to a set of SSID-specific features indicative of characteristics and/or properties associated with the training SSID 712.

Taking the positive training pair 714 as an example, the set of SSID-specific features may include one or more of, but not limited to:

A length of characters of the training SSID 712;

A number of lexical tokens in the training SSID 712;

In some non-limiting embodiments of the present technology, the second subset of features corresponds to a set of venue-specific features indicative of characteristics and/or properties associated with the training venue identifier.

Taking the positive training pair 714 as an example, the set of venue-specific features may include one or more of, but not limited to:

The operating state of the venue associated with the first training venue identifier 704;

The popularity of the venue associated with the first training venue identifier 704;

A precision level of the location of the venue associated with the first training venue identifier 704;

Whether the venue is nested in another venue;

A country of the venue associated with the first training venue identifier 704;

A main category assigned to the venue associated with the first training venue identifier 704;

A number of categories assigned to the venue associated with the first training venue identifier 704;

An average venue name length of characters among all the venue name variations;

An average number of lexical tokens in the venue name among all venue name variations;

A number of venue name variations associated with the first training venue identifier 704;

A number of all URL variations associated with the first training venue identifier 704;

A minimum length of a URL associated with the first training venue identifier 704 from all URL variations;

A number of trusted URL variations associated with the first training venue identifier 704;

A maximum length of a URL associated with the first training venue identifier 704 from all URL variations;

An average length of all URL variations associated with the first training venue identifier 704; and An average number of lexical tokens in a URL among all URL variations associated with the first training venue identifier 704.

Once the set of features for pairs included within the set of training data 722 has been determined, the MLA 618 is configured to analyze the set of features.

More precisely, recalling that each training pairs (i.e. the positive training pair 714, the first negative training pair 716, and the second negative training pair 718) is assigned a label indicative of whether the training SSID 712 is associated with the respective training venue identifiers, the MLA 618 is configured to learn, what set of features is indicative of the training SSID 712 corresponding to the associated training venue identifier.

Accordingly, the MLA 618 is configured to generate an inferred function which is configured to predict the confidence parameter of the first pair 612 and the second pair 614 (see FIG. 6) during the in-use phase, based on the set of features associated with each of the first pair 612 and the second pair 614.

Needless to say, although there is only depicted a single instance of the training of the MLA 618, it is done so for ease of illustration. It should be expressly understood that the training of the MLA 618 is done iteratively using a plurality of different training SSID s.

Determining Routine 606—in Use

Now, having described the manner in which the MLA 618 has been trained prior to the in-use phase, attention will now be turned back to FIG. 6.

As briefly described above, in response to receiving the data packet 616, the determining routine 606 is configured to input the first pair 612 and the second pair 614 to determine a first confidence parameter associated with the first pair 612 and a second confidence parameter associated with the second pair 614.

How the confidence parameter is implemented is not limited. For example, the confidence parameter may be implemented as a percentage, as a range (from 0 to 1) and the like.

In some non-limiting embodiments of the present technology, in response to the first confidence parameter being a highest ranked confidence parameter, the determining routine 606 is configured to determine an occurrence of a visit by the user to the venue associated with the first venue identifier 306.

In some non-limiting embodiments of the present technology, in response to determining that the user has visited the venue associated with the first venue identifier 306, the determining routine 606 is configured to access the user profile database 128 and retrieve the aggregated user profile of the user based on the user device ID 206 included within the data packet 616.

Let us assume for example, that it is determined that the aggregated user profile 414 is associated with the electronic device 102.

In some non-limiting embodiments of the present technology, the determining routine 606 is configured to execute an impression bid process. More particularly, the determining routine 606 is configured to access the digital content item database 130 and determine which of the one or more content items is to be transmitted to the electronic device 102 via the impression bid process.

In some non-limiting embodiments of the present technology, recalling that the plurality of digital content items is clustered into one or more venue clusters 502 within the digital content item database 130, the determining routine 606 is configured to access the cluster that is associated with the first venue identifier 306.

Let us assume, for the purpose of illustration, that the first venue cluster 504 is associated with the first venue identifier 306, where the first venue cluster 504 includes the first digital content item 504 and the second digital content item 506.

Based on the aggregated user profile 414 and the target parameters associated with each of the first digital content item 504 and the second digital content item 506, the determining routine 606 is configured to select one of the first digital content item 504 and the second digital content item 506 to be transmitted to the electronic device 102 via the impression bid process.

For example, let us assume that based on the aggregated user profile 414, the user of the electronic device 102 is determined to be a female in her mid-twenties with an interest in the Russian writer, Anton Tchekhov. Based on this information, the determining routine 606 is configured to execute the impression bid process (such as a real-time bidding process), in which the determining routine 606 is configured to determine the digital content item having a highest resultant bidding value based on the target parameters associated with each of the first digital content item 504 and the second digital content item 506.

Let us assume, for the purpose of the example, that the highest resulting bidding value corresponds to the first digital content item 504, which corresponds to an ad for a Russian literature club being hosted weekly at the venue associated with the first venue identifier 306, that is destined for adults having an interest in Russian literature.

As a result, the determining routine 606 is configured to transmit a data packet 620 to the electronic device 102, which includes the first digital content item 504 to be displayed on the display screen of the electronic device 102.

Figure 8:
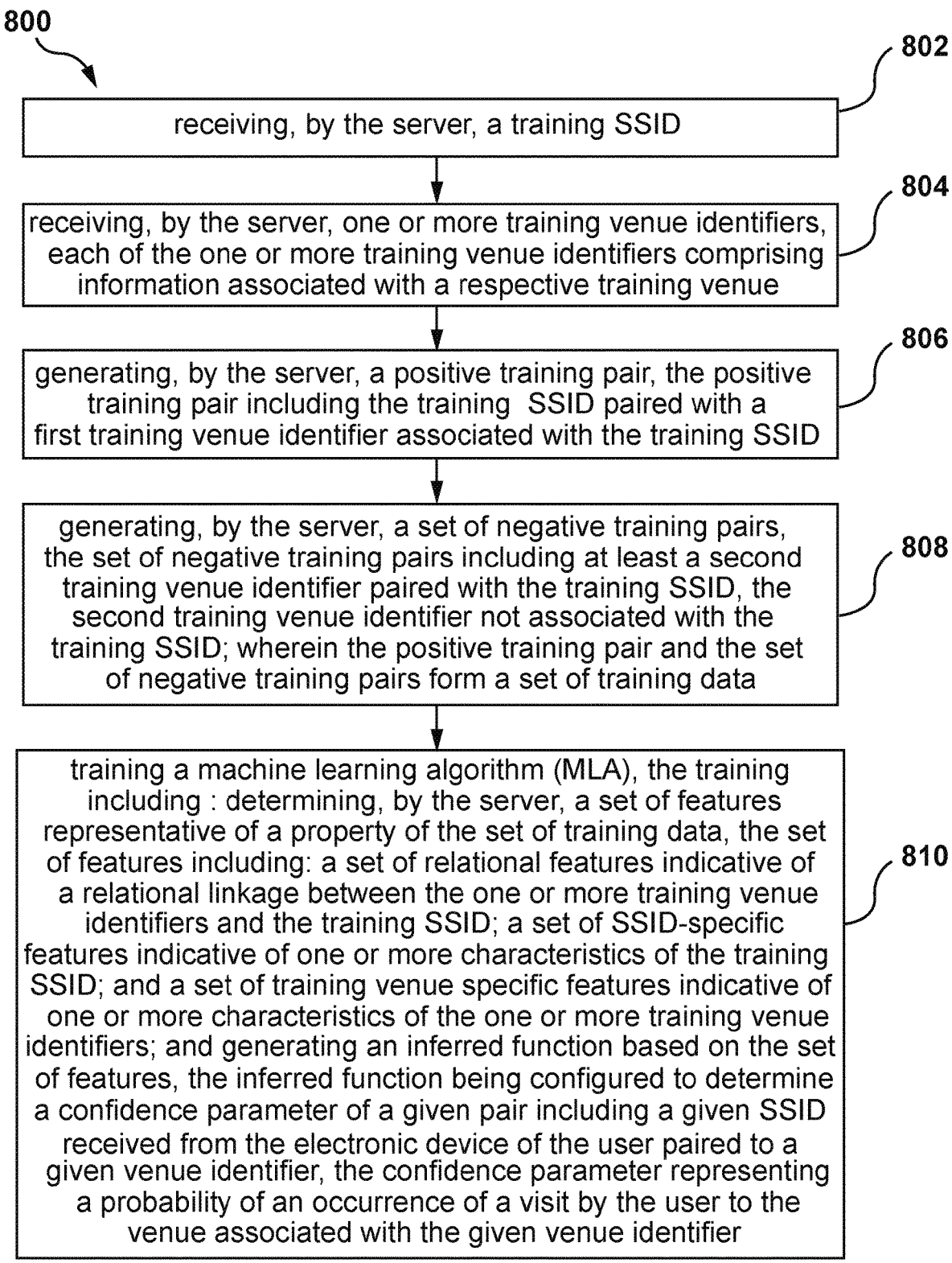
FIG. 8 depicts a block diagram of a flow chart of a method for determining an occurrence of a visit to a venue by a user.

Given the architecture and examples provided hereinabove, it is possible to execute a computer-implemented method for providing a recommended content in response to determining an occurrence of a visit by a user to a venue. With reference to FIG. 8, there is depicted a flow chart of a method 800 for determining an occurrence of a visit by a user to a venue. The method 800 being executable in accordance with non-limiting embodiments of the present technology. The method 800 can be executed by the server 118.

Step 802: receiving, by the server, a training SSID

The method 800 starts at step 802, where the server 118 receives the training SSID 712 via, for example, the data packet 710.

The training SSID 712 corresponds to a SSID known to be associated with a venue associated with one of the training venue identifiers.

How the training SSID 712 is known to be associated with a venue associated with one of the training venue identifiers is not limited. In some non-limiting embodiments of the present technology, the training SSID 712 may be received from an owner (such as the business owner) of a given training venue associated with one of the training venue identifiers. In some non-limiting embodiments of the present technology, the training SSID 712 may be received from a crowdsourcing platform, such as Yandex.Toloka™ platform, where workers are tasked with visiting a venue associated with one of the training venue identifiers and provide the associated SSID.

In some non-limiting embodiments of the present technology, the data packet 710 further includes a location at which the training SSID 712 has been collected by the owner and/or the worker.

Step 804: receiving, by the server, one or more training venue identifiers, each of the one or more training venue identifiers comprising information associated with a respective training venue At step 804, the server 118 is configured to retrieve the first training venue identifier 704, which is associated with the training SSID 712. In other words, the training SSID 712 corresponds to the SSID of a hotspot provided at a venue associated with the first training venue identifier 704.

The determining routine 606 is then configured to retrieve one or more training venue identifiers stored within the database 126 that are located near a location of the first training venue identifier 704, but are not or different from the location of the training SSID 712. For example, the determining routine 606 may be configured to retrieve the second training venue identifier 706 and the third training venue identifier 708, which are both associated to a respective location within a predetermined distance of the venue associated with the first training venue identifier 704.

Each of the retrieved training venue identifier (i.e. the first training venue identifier 704, the second training venue identifier 706 and the third training venue identifier 708) includes information regarding a particular venue.

For example, taking the first training venue as an example, it is associated with a business venue name, and includes information regarding the associated business venue.

Step 806: generating, by the server, a positive training pair, the positive training pair including the training SSID paired with a first training venue identifier associated with the training SSID At step 806, the server 118 is configured to pair the training SSID 712 and the first training venue identifier 704 to generate the positive training pair 714.

Step 808: generating, by the server, a set of negative training pairs, the set of negative training pairs including at least a second training venue identifier paired with the training SSID, the second training venue identifier not associated with the training SSID; wherein the positive training pair and the set of negative training pairs form a set of training data At step 806, the server 118 is configured to generate the set of negative training pairs 720, which includes the first negative training pair 716 and the second negative training pair 718.

The first negative training pair 716 includes the training SSID 712 paired with the second training venue identifier 706. The second negative training pair 718 includes the training SSID 712 paired with the third training venue identifier 708.

The set of negative training pairs 720 and the positive training pair 714 together form the set of training data 722.

In some non-limiting embodiments of the present technology, the server 118 is further configured to assign a label to each training pairs included within the set of training data 722. More precisely, the server 118 is configured to assign a label indicative of whether each training pair is a positive training pair or a negative training pair.

Step 810: training a machine learning algorithm (MLA), the training including: determining, by the server, a set of features representative of a property of the set of training data, the set of features including: a set of relational features indicative of a relational linkage between the one or more training venue identifiers and the training SSID; a set of SSID-specific features indicative of one or more characteristics of the training SSID; and a set of training venue specific features indicative of one or more characteristics of the one or more training venue identifiers; and generating an inferred function based on the set of features, the inferred function being configured to determine a confidence parameter of a given pair including a given SSID received from the electronic device of the user paired to a given venue identifier, the confidence parameter representing a probability of an occurrence of a visit by the user to the venue associated with the given venue identifier At step 812, set of training data 722 is inputted into the MLA 618. The MLA 618 includes a training logic to determine a set of features associated with the set of features associated with each training pairs (such as the positive training pair 714) and the assigned label (such as the first label 724).

More precisely, recalling that each training pairs (i.e. the positive training pair 714, the first negative training pair 716, and the second negative training pair 718) is assigned a label indicative of whether the training SSID 712 is associated with the respective training venue identifiers, the MLA 618 is configured to learn, what set of features is indicative of the training SSID 712 corresponding to the associated training venue identifier.

In some non-limiting embodiments of the present technology, the set of features may include a first set of features and a second set of features.

In some non-limiting embodiments of the present technology, the first set of features corresponds to a set of features indicative of a relational linkage between each of the one or more training venue identifiers and the training SSID 712 and may, for example, include locational relationship(s) between the training SSID 712 and the one or more training venue identifiers, and/or textual relationship(s) between the training SSID 712 and the various information associated with the one or more training venue identifiers.

In some non-limiting embodiments of the present technology, the second set of features can be subdivided into a first subset of features and a second subset of features. Each of the first subset of features and the second subset of features comprises one or more features indicative of properties of the one of the training SSID 712 and the training venue identifiers.

In some non-limiting embodiments of the present technology, the first subset of features corresponds to a set of SSID-specific features indicative of characteristics and/or properties associated with the training SSID 712.

In some non-limiting embodiments of the present technology, the second subset of features corresponds to a set of venue-specific features indicative of characteristics and/or properties associated with the training venue identifier.

Accordingly, the MLA 618 is configured to generate an inferred function which is capable of assigning the confidence parameter to the first pair 612 and the second pair 614 (see FIG. 6) during the in-use phase, based on the set of features associated with each of the first pair 612 and the second pair 614.

The method 800 then terminates or returns to step 802 with a new training SSID.

It should be apparent to those skilled in the art that at least some embodiments of the present technology aim to expand a range of technical solutions for addressing a particular technical problem encountered by the conventional method of determining the occurrence of a visit to a venue by a user.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or reordered without departing from the teachings of the present technology. Accordingly, the order and grouping of the steps is not a limitation of the present technology.

The invention claimed is:

1. A computer-implemented method of determining an occurrence of a visit to a venue by a user associated with an electronic device, the method being executed by a server, the method comprising, at a training phase:
    receiving, by the server, a training SSID;
    receiving, by the server, one or more training venue identifiers, each of the one or more training venue identifiers comprising information associated with a respective training venue;
    generating, by the server, a positive training pair, the positive training pair including the training SSID paired with a first training venue identifier associated with the training SSID;
    generating, by the server, a set of negative training pairs, the set of negative training pairs including at least a second training venue identifier paired with the training SSID, the second training venue identifier not associated with the training SSID; wherein
    the positive training pair and the set of negative training pairs form a set of training data;
    training a machine learning algorithm (MLA), the training including:
        determining, by the server, a set of features representative of a property of the set of training data, the set of features including:
            a set of relational features indicative of a relational linkage between the one or more training venue identifiers and the training SSID;
            a set of SSID-specific features indicative of one or more characteristics of the training SSID; and
            a set of training venue specific features indicative of one or more characteristics of the one or more training venue identifiers; and
        generating an inferred function based on the set of features, the inferred function being configured to determine a confidence parameter of a given pair including a given SSID received from the electronic device of the user paired to a given venue identifier, the confidence parameter representing a probability of an occurrence of a visit by the user to the venue associated with the given venue identifier.

2. The method of claim 1, the method further comprising, at an in-use phase:
    receiving, from the electronic device, by the server, a SSID previously accessed by the electronic device;
    receiving, by the server, a first venue identifier and a second venue identifier based on the SSID;
    generating, by the server, a first pair comprising the SSID and the first venue identifier and a second pair comprising the SSID and the second venue identifier;
    determining, using the MLA, the confidence parameter of each of the first pair and second pair based on the set of linking features and the set of non-linking features associated with each of the first pair and the second pair; and
    in response to determining that the confidence parameter of the first pair is above the confidence parameter of the second pair, determining, by the server, the occurrence of the visit by the user to a venue associated with the first venue identifier.

3. The method of claim 2, wherein the first venue identifier being associated with a first venue location and the second venue identifier being associated with a second venue location, the method further comprising:
    receiving, from the electronic device, an access location at which the SSID has been accessed by the electronic device; and
    receiving the first venue identifier and the second venue identifier in response to the first venue location and the second venue location being within a predetermined distance from the access location.

4. The method of claim 2, wherein the method further comprises:
    receiving an electronic device ID associated with the electronic device;
    determining a profile parameter of the user based on the electronic device ID, the profile parameter being indicative of profile characteristics of the user;
    in response to the determining the occurrence of the visit by the user to the venue, selecting a digital content item based on the profile parameter, the digital content item being associated with the venue; and
    transmitting the digital content item to the electronic device for display.

5. The method of claim 1, wherein a ratio of the positive training pair to the set of negative training pairs within the set of training data is 1 to 40.

6. The method of claim 1, wherein the method further comprises:
    receiving a training SSID location, the training SSID location corresponding to a geographical location associated with the training SSID;
    analyzing a plurality of training venue identifiers, each of the training venue identifier included within the plurality of training venue identifiers being associated with a training venue location; and wherein
        receiving the one or more training venue identifiers comprises receiving one or more training venue identifiers, each having a respective training venue location in a predetermined distance from the training SSID location.

7. The method of claim 6, wherein the predetermined distance corresponds to 75 metres from the training SSID location.

8. The method of claim 6, wherein the generating the positive training pair comprises:
    pairing the training SSID with the first training venue identifier in response to the training SSID location corresponding to the training venue location associated with the first training venue identifier; and wherein
    the generating the set of negative training pairs comprises:

pairing the training SSID with at least the second training venue identifier in response to the training SSID location being different to the training venue location associated with the second training venue identifier.

9. The method of claim 1, wherein for a given training venue identifier, the information associated with a given training venue comprises at least one of:
   a name of the training venue;
   an operating status of the training venue;
   a location of the training venue;
   a category associated with the training venue; and
   one or more URLs associated with the training venue.

10. The method of claim 9, wherein the method further comprises:
    receiving a training SSID location, the training SSID location corresponding to a geographical location associated with the training SSID; and wherein
    the information associated with the given training venue further comprises a training venue location indicative of a location of the training venue; and
    the set of relational features comprises at least one of:
        a distance between the training SSID location and the training venue location;
        a cosine similarity between character frequency vectors of the name of the training venue and the training SSID;
        a cosine similarity between trigram frequency vectors of the name of the training venue and the training SSID;
        a cosine similarity between token frequency vectors of the name of the training venue and the training SSID; and
        a cosine similarity between TF-IDF vectors of the name of the training venue and the training SSID.

11. The method of claim 9, wherein the set of SSID-specific features comprises at least one of:
    a character length of the training SSID; and
    a number of lexical tokens within the training SSID.

12. The method of claim 9, wherein the set of non-linking features comprises at least one of:
    the operating status of the training venue;
    the category associated with the venue; and
    a number of URL variations associated with the training venue.

13. The method of claim 1, wherein the MLA is using a Friedman's gradient boosting decision trees model.

14. A server for determining an occurrence of a visit to a venue by a user associated with an electronic device, the server comprising a processor configured to, at a training phase:
    receive a training SSID;
    receive one or more training venue identifiers, each of the one or more training venue identifiers comprising information associated with a respective training venue;
    generate a positive training pair, the positive training pair including the training SSID paired with a first training venue identifier associated with the training SSID;
    generate a set of negative training pairs, the set of negative training pairs including at least a second training venue identifier paired with the training SSID, the second training venue identifier not associated with the training SSID; wherein
        the positive training pair and the set of negative training pairs form a set of training data;
    train a machine learning algorithm (MLA), to train the MLA the processor being configured to:
        determine a set of features representative of a property of the set of training data, the set of features including:
            a set of relational features indicative of a relational linkage between the one or more training venue identifiers and the training SSID;
            a set of SSID-specific features indicative of one or more characteristics of the training SSID; and
            a set of training venue specific features indicative of one or more characteristics of the one or more training venue identifiers; and
        generate an inferred function based on the set of features, the inferred function being configured to determine a confidence parameter of a given pair including a given SSID received from the electronic device of the user paired to a given venue identifier, the confidence parameter representing a probability of an occurrence of a visit by the user to the venue associated with the given venue identifier.

15. The server of claim 14, the processor is further configured to, at an in-use phase:
    receive, from the electronic device, a SSID previously accessed by the electronic device;
    receive a first venue identifier and a second venue identifier based on the SSID;
    generate a first pair comprising the SSID and the first venue identifier and a second pair comprising the SSID and the second venue identifier;
    determine, using the MLA, the confidence parameter of each of the first pair and second pair based on the set of linking features and the set of non-linking features associated with each of the first pair and the second pair; and
    in response to determining that the confidence parameter of the first pair is above the confidence parameter of the second pair, determine the occurrence of the visit by the user to a venue associated with the first venue identifier.

16. The server of claim 15, wherein the first venue identifier is associated with a first venue location and the second venue identifier is associated with a second venue location, the processor being further configured to:
    receive, from the electronic device, an access location at which the SSID has been accessed by the electronic device; and
    receive the first venue identifier and the second venue identifier in response to the first venue location and the second venue location being within a predetermined distance from the access location.

17. The server of claim 15, the processor being further configured to:
    receive an electronic device ID associated with the electronic device;
    determine a profile parameter of the user based on the electronic device ID, the profile parameter being indicative of profile characteristics of the user;
    in response to the determining the occurrence of the visit by the user to the venue, select a digital content item based on the profile parameter, the digital content item being associated with the venue; and
    transmit the digital content item to the electronic device for display.

18. The server of claim 14, the processor being further configured to:
    receive a training SSID location, the training SSID location corresponding to a geographical location associated with the training SSID;

analyze a plurality of training venue identifiers, each of the training venue identifier included within the plurality of training venue identifiers being associated with a training venue location; and wherein to receive the one or more training venue identifiers, the processor is configured to receive one or more training venue identifiers each having a respective training venue location in a predetermined distance from the training SSID location.

19. The server of claim 18, wherein to generate the positive training pair, the processor is configured to:

pair the training SSID with the first training venue identifier in response to the training SSID location corresponding to the training venue location associated with the first training venue identifier; and wherein to generate the set of negative training pairs, the processor is configured to:

pair the training SSID with at least the second training venue identifier in response to the training SSID location being different to the training venue location associated with the second training venue identifier.

20. The server of claim 14, wherein for a given training venue identifier, the information associated with a given training venue comprises at least one of:

a name of the training venue;
an operating status of the training venue;
a location of the training venue;
a category associated with the training venue; and
one or more URLs associated with the training venue.

* * * * *